US012238485B2

(12) United States Patent
Flaig

(10) Patent No.: US 12,238,485 B2
(45) Date of Patent: Feb. 25, 2025

(54) CHARGING CONTACT ASSEMBLY, HEARING DEVICE AND HEARING DEVICE SYSTEM

(71) Applicant: Sivantos Pte. Ltd., Singapore (SG)

(72) Inventor: Uwe Flaig, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 211 days.

(21) Appl. No.: 18/075,587

(22) Filed: Dec. 6, 2022

(65) Prior Publication Data

US 2023/0179931 A1 Jun. 8, 2023

(30) Foreign Application Priority Data

Dec. 8, 2021 (DE) ..................... 10 2021 213 958.2

(51) Int. Cl.
*H04R 25/00* (2006.01)

(52) U.S. Cl.
CPC ........... *H04R 25/556* (2013.01); *H04R 25/60* (2013.01); *H04R 2225/021* (2013.01); *H04R 2225/31* (2013.01); *H04R 2225/61* (2013.01)

(58) Field of Classification Search
CPC .......... H04R 2225/61; H04R 2225/021; H04R 25/556
See application file for complete search history.

(56) References Cited

U.S. PATENT DOCUMENTS

| | | | |
|---|---|---|---|
| 8,098,862 B2 | 1/2012 | Koch et al. | |
| 9,014,407 B2 | 4/2015 | Boguslavskij et al. | |
| 10,321,246 B2 | 6/2019 | Flaig et al. | |
| 10,667,066 B2 | 5/2020 | Beyfuss et al. | |
| 2019/0110141 A1 * | 4/2019 | Beyfuss | H04R 25/602 |

FOREIGN PATENT DOCUMENTS

| | | | |
|---|---|---|---|
| CN | 217135694 U | 8/2022 |
| DE | 102012214469 A1 | 12/2013 |
| DE | 102014218053 A1 | 3/2016 |
| EP | 1973375 A2 | 9/2008 |
| WO | 2017212052 A1 | 12/2017 |

* cited by examiner

*Primary Examiner* — Sunita Joshi

(74) *Attorney, Agent, or Firm* — Laurence A. Greenberg; Werner H. Stemer; Ralph E. Locher

(57) ABSTRACT

A charging contact assembly for a hearing device system. The assembly has a first charging contact which is accessible on an outer side for contacting with a first mating contact of a mating contact assembly, and a second charging contact which is accessible on the outer side for contacting with a second mating contact of the mating contact assembly. Furthermore, the charging contact assembly has a control contact which is galvanically isolated on the outer side from the first and the second charging contacts, and a charging controller which is configured to detect a proper contacting of the first and second charging contacts with the corresponding mating contact based on contact with the control contact.

9 Claims, 3 Drawing Sheets

CHARGING CONTACT ASSEMBLY, HEARING DEVICE AND HEARING DEVICE SYSTEM

CROSS-REFERENCE TO RELATED APPLICATION

This application claims the priority, under 35 U.S.C. § 119, of German Patent Application DE 10 2021 213 958.2, filed Dec. 8, 2021; the prior application is herewith incorporated by reference in its entirety.

FIELD AND BACKGROUND OF THE INVENTION

The invention relates to a charging contact assembly for a hearing device system. The invention furthermore relates to a hearing device and to a hearing device system.

Hearing devices are commonly used for outputting an audio signal to the auditory system of the wearer of the hearing device. The output is affected by means of an output transducer, usually over an acoustic path using airborne sound by means of a loudspeaker (also known as a "receiver"). Hearing devices of this kind are also frequently used as so-called hearing aid devices (also in short: hearing aids). When used for this purpose the hearing devices usually contain an acoustic input transducer (in particular a microphone) and a signal processor, which is configured to process the input signal (also: microphone signal), generated by the input transducer from the ambient sound, using at least one signal processing algorithm which is typically stored on a user-specific basis, in such a way that a hearing deficit of the hearing device wearer is at least partially compensated. Particularly in the case of a hearing aid device, the output transducer in addition to a loudspeaker can also alternatively be a so-called bone conduction receiver or a cochlear implant, which are configured to provide mechanical or electrical coupling of the audio signal into the auditory system of the wearer. The term hearing device additionally covers in particular devices such as so-called tinnitus maskers, headsets, headphones, and the like.

Typical designs of hearing devices, in particular hearing aids, are behind-the-ear ("BTE") and in-the-ear ("ITE") hearing devices. These designations are indicative of the intended wearing position. For example, behind-the-ear hearing devices have a (main) housing that is worn behind the ear cup. Here the models can be distinguished into two types: the first being those having the loudspeaker arranged in this housing. In these the sound is usually output to the ear by means of a sound tube, which is worn in the ear canal. The second type includes models that have an external loudspeaker placed in the auditory canal. In-the-ear hearing devices, on the other hand, have a housing that is worn in the ear cup or even entirely in the ear canal.

Modern hearing aids often have integrated, i.e. permanently installed secondary cells, i.e. "accumulators" as their power source. For recharging, in addition to e.g. USB cables, charging cradles or charging boxes that have galvanic charging contact systems are also used. Galvanic contacting usually has the advantage that not only is its implementation comparatively simple compared to contactless charging systems, but it also often requires fewer or smaller-sized components.

Usually, the hearing devices are configured to deactivate (switch off) during a charging process, i.e. when the hearing device is positioned in the charging cradle or box and contacted via the corresponding contacts. In the case of hearing aids, one practical advantage of this is to avoid feedback noise that occurs, e.g. in a closed charging box, due to their own acoustic output signal being picked up. In most cases, a charging current or a charging voltage is evaluated for this purpose. When the hearing device is removed from the charging cradle or box, the hearing device activates again.

SUMMARY OF THE INVENTION

The object of the invention is to enable a particularly reliable detection of a hearing device making contact with a charging device.

This object is achieved according to the invention by a charging contact assembly having the features of the independent charging contact assembly claim. In addition, this object is achieved according to the invention by means of a hearing device having the features of the independent hearing device claim. The object is also achieved according to the invention by means of a hearing device system having the features of the independent hearing device system claim. Advantageous embodiments and developments of the invention, some of which are inventive in themselves, are set out in the dependent claims and the following description.

The charging contact assembly according to the invention is configured and intended for use in a hearing device system. The charging contact assembly has a first charging contact, which is accessible on an outer side (of the charging contact assembly and thus on an element supporting it, for example, a hearing device) for contacting with a first mating contact of a mating contact assembly. In addition, the charging contact assembly has a second charging contact, accessible on the outer side for contacting with a second mating contact of the mating contact assembly. The first and the second charging contact form in particular a contact pair ("positive" and "negative" contact, specifically two contacts assigned to different electrical potentials) which is required for galvanic contacting for a properly conducted charging process. Furthermore, the charging contact assembly has a control contact which is (arranged) on the outer side, galvanically isolated from the first and the second charging contact. Further, the charging contact assembly also has a charging controller which is designed to deactivate the hearing device (of the hearing device system), which is assigned to the first and second charging contacts—i.e. comprises them or is connected to them for charging—, when the control contact is bridged to the first charging contact.

In the preferred case that the first and second charging contacts as well as the control contact—thus the charging contact assembly—are part of the hearing device, the charging controller is thus configured to deactivate the hearing device, i.e. in particular, to switch off at least one audio signal processor.

On the basis of the detected bridging, the charging controller thus advantageously concludes in particular that a proper contacting of the first and second charging contact with the corresponding mating contact is present due to the hearing device positioned in the charging unit (or connected to it). This detection is advantageously independent of the power supply to the charging unit and is therefore particularly reliable. The invention advantageously thus also enables a particularly reliable control of the hearing device system or the hearing device alone. For example, the charging process by means of the charging unit (e.g. a charging cradle or a charging box), which preferably (at least for the properly conducted charging process) forms a part of the hearing device system, can only be started when the proper contact is detected. Likewise, the hearing device can advantageously be reliably deactivated, or re-activated in the event of a loss of contact.

In a preferred embodiment, the control contact is positioned such that it is contacted by the first mating contact in the proper contacting state. Thus, this first mating contact bridges the first charging contact to the control contact, thus connecting them to each other. This means that no additional mating contact corresponding to the control contact needs to be provided on the mating contact assembly. This in turn makes a "redesign" of any existing mating contact assemblies unnecessary.

More preferably, the control contact has a contact surface which is arranged at the same level as a contact surface of the first charging contact. In other words, the contact surfaces of the control contact and the first charging contact lie in the same plane. This simplifies the simultaneous contacting of these two contacts by the first mating contact.

In contrast, in a practical embodiment the contact surfaces of the first and second charging contacts are located at different levels. As a result, for example, it is possible to avoid accidental contacting of the first and second charging contacts by the same mating contact.

In a further practical embodiment, the control contact is set to high impedance. Optionally, this is carried out using a so-called "tri-state", in particular a digital circuit element, the outputs of which can assume not just the usual two states ("0" and "1"), but also a third state, usually designated by "Z" or also by "high impedance". Alternatively, pull-down or pull-up resistors can also be used. Optionally, the control contact is wired in such a way that in the unbridged (i.e. in the non-contacted) state it is connected to the charging controller with high impedance, whereas in the case of bridging by means of the first mating contact the control contact is pulled to a different potential. In particular, if a tri-state is not used, the control contact is wired such that in the unbridged state the latter is connected via a high impedance, e.g. with 100 kOhm, to "plus" (i.e. to the positive or higher potential, also "logical 1"), to which the second charging contact is preferably connected. If the control contact is bridged to the first charging contact, the control contact is pulled to "logical zero".

In a preferred embodiment the charging controller is configured to bridge the control contact to the first charging contact and to detect the proper contact from the fact that the control contact—in particular as described above—is pulled to a different electrical potential, in particular the potential to which the first charging contact is also connected. This potential depends, for example, on whether a charging voltage (with an associated charging voltage value) is applied between the mating contacts or whether the first charging contact, for example, is at the potential of the secondary cell to be charged (e.g. the secondary cell of the hearing device). Thus, the detection of whether the contact with the first contact is present works independently of whether the charging unit is operational or inactive. In the event that the charging contact assembly of the hearing device and the mating contact assembly are assigned to the charging unit, the case may occur whereby the hearing device is inserted into the charging unit and is contacted with the mating contact assembly without the charging unit being in operation (e.g. not connected to a mains supply or the like). Since hearing devices are normally deactivated during charging, if the deactivation is based only on the detection of the charging voltage the case may occur whereby the hearing device is activated and thus discharges the secondary cell—or, in the case of a hearing aid device, feedback whistling can even occur. Both can be avoided by the detection of the contact as described above.

In a practical embodiment, the first charging contact and the control contact are arranged on a circular line around the second charging contact. This means that a rotationally symmetrical mating contact assembly can be used, which allows a contact to be easily established between the charging contact assembly and the mating contact assembly.

In a preferred development, the contact surfaces of the first charging contact and the control contact are each formed as circular arc segments. In particular, when viewed together, the two contact surfaces resemble a circular ring separated along a diameter line.

The hearing device according to the invention has the charging contact assembly described above.

The deactivation on detecting a bridging also implements a restart function of the hearing aid. This is particularly practical for modern hearing devices that no longer have a mechanical "off" switch. In this case, a restart can be forced if the hearing aid is no longer functioning properly and there is no response to the standard actions ("software reset").

The charging controller is preferably integrated in a controller of the hearing device.

In an optional embodiment, at least the core of the controller and/or the charging controller is formed by a microcontroller with a processor and a data memory, in which the functionality for detecting the contact is implemented in software in the form of operating software (firmware). Alternatively, the controller or the charging controller is also formed by means of circuitry, optionally a non-programmable electronic component, e.g. an ASIC.

The hearing device system according to the invention contains the above-mentioned hearing device and a charging unit (in particular the one mentioned above). The hearing device thus (preferably) contains the charging contact assembly or alternatively the mating contact assembly, and the charging unit conversely contains the mating contact assembly or the charging contact assembly as appropriate.

Thus, the hearing device and also the hearing device system share the features and the resulting advantages with the charging contact assembly.

The conjunction "and/or" here and in the following is to be understood, in particular, to mean that features linked by means of this conjunction can be implemented both jointly and as alternatives to each other.

Other features which are considered as characteristic for the invention are set forth in the appended claims.

Although the invention is illustrated and described herein as embodied in a charging contact assembly, a hearing device and a hearing device system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
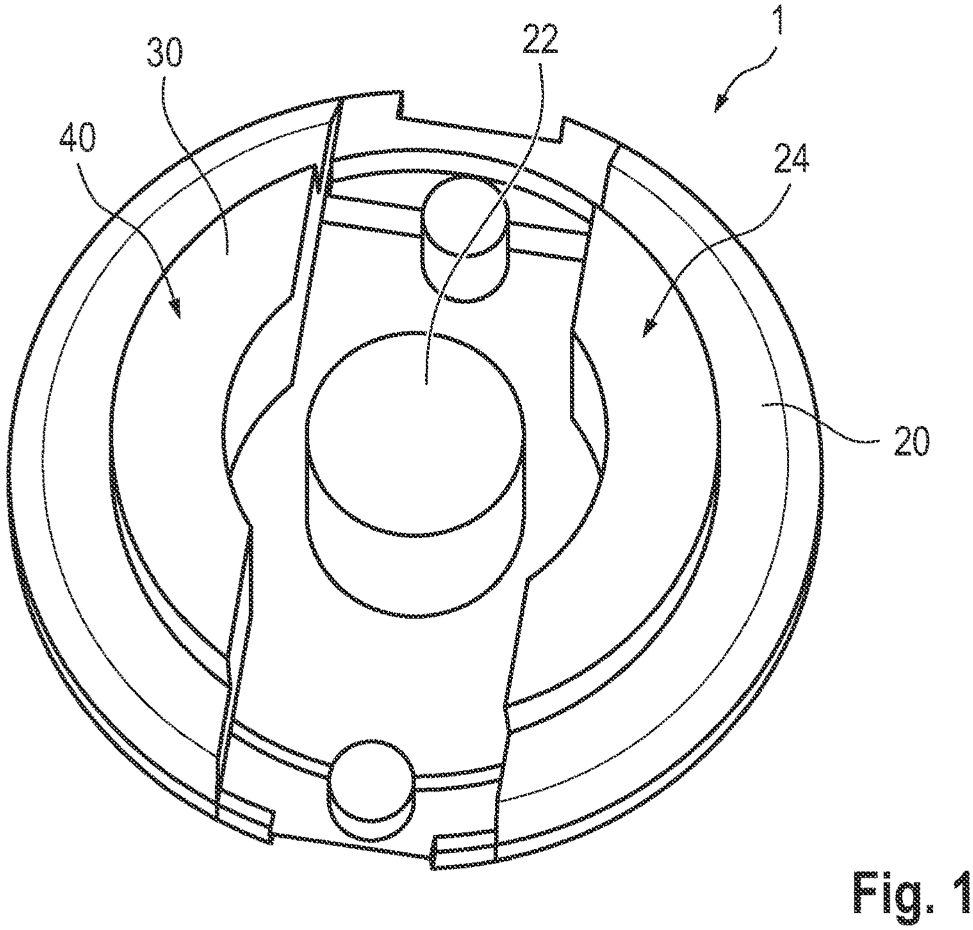
FIG. 1 is a diagrammatic, perspective view of a charging contact assembly for a hearing device system according to the invention.

Corresponding parts are provided with identical reference numerals in all figures.

Figure 2:
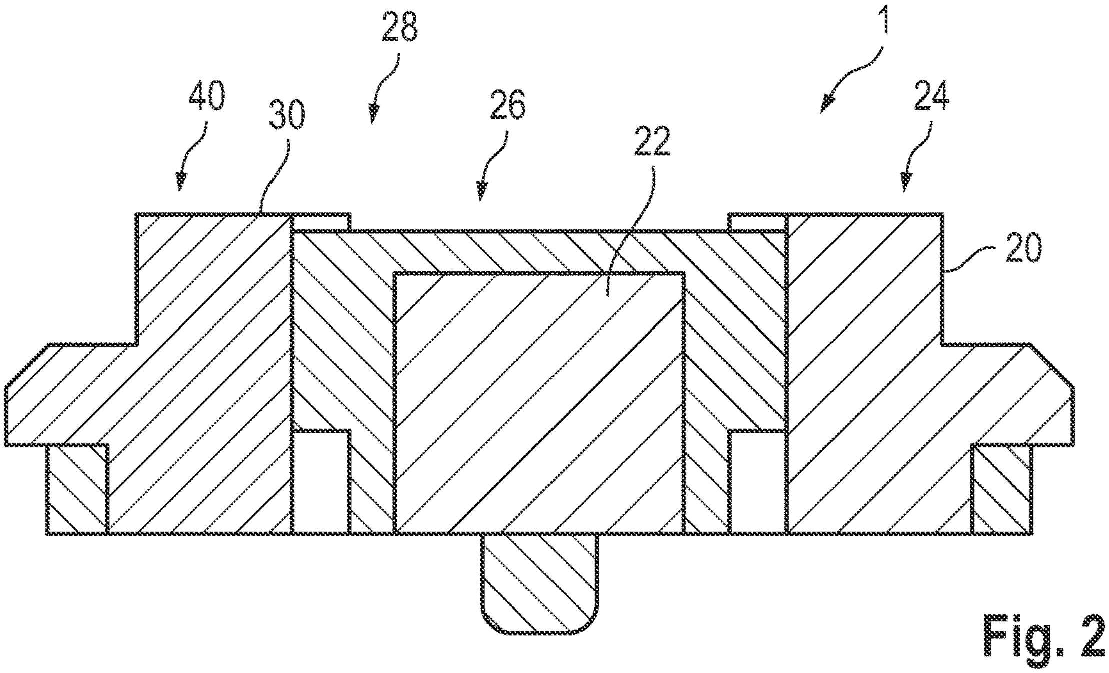
FIG. 2 is a partial sectional view, taken along the line II-II shown in FIG. 1, of the charging contact assembly.
Figure 5:
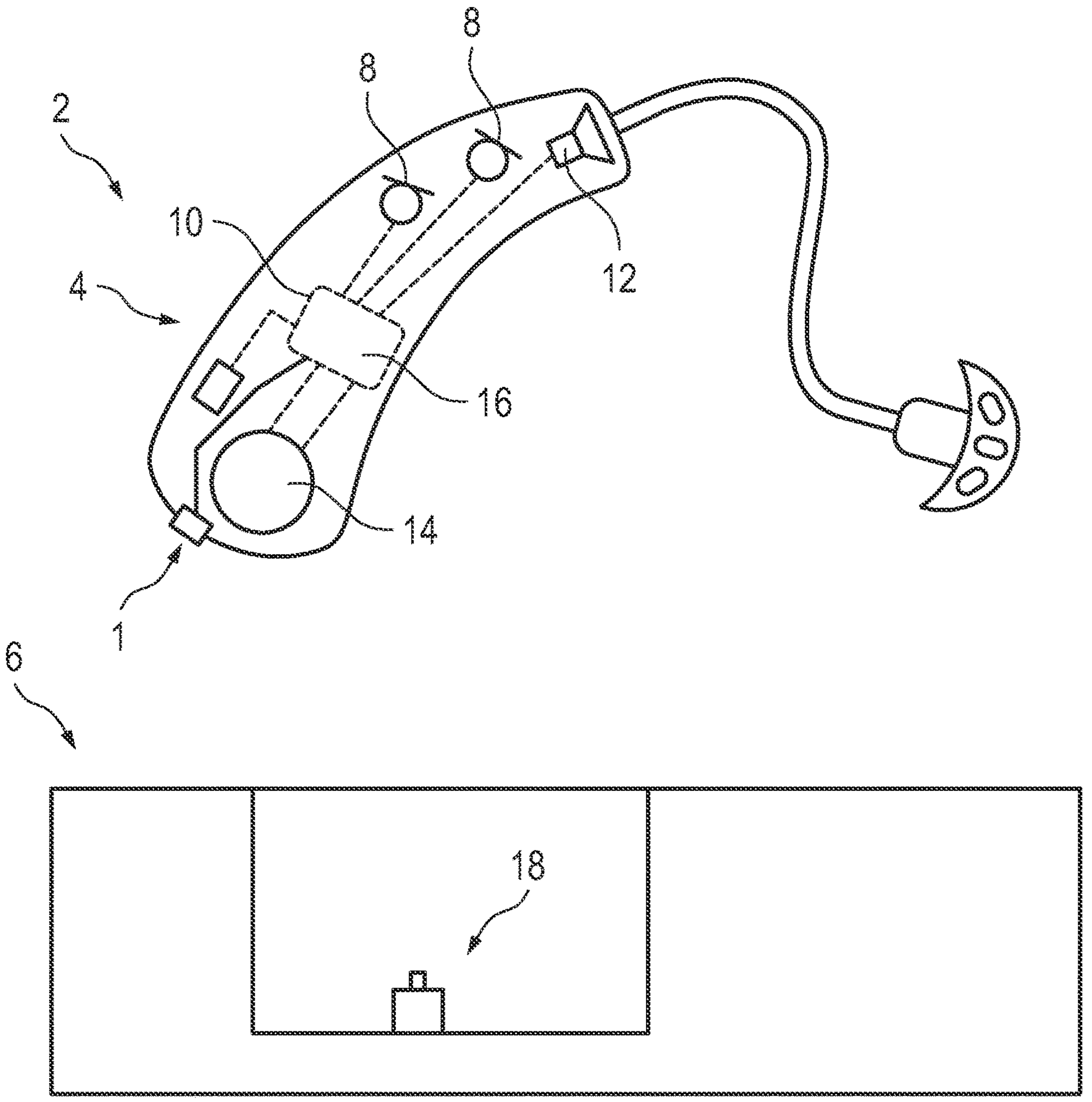
FIG. 5 is a schematic view of the hearing device system.

Referring now to the figures of the drawings in detail and first, particularly to FIGS. 1 and 2 thereof, there is shown schematically charging contact assembly 1 for a hearing device system 2 schematically illustrated in FIG. 5. The hearing aid system 2 contains at least one hearing device in the form of a hearing aid device (in short: hearing aid 4), here formed by a hearing aid to be worn behind the ear, and a charging unit 6. The hearing aid 4 has two microphones 8 for detecting sound, a signal processor ("controller 10") and a loudspeaker 12 for outputting output signals captured by means of the microphones 8 and processed by means of the controller 10. The hearing aid 4 has a secondary cell 14 for supplying power.

The charging contact assembly 1 in the illustrated exemplary embodiment is part of the hearing aid 4 and is used for inputting charging energy provided by the charging unit 6 into the secondary cell 14. A charging controller 16 in the illustrated exemplary embodiment is part of the controller 10. The charging unit 6 has a corresponding mating contact assembly 18 for the galvanic contacting of the charging contact assembly 1 (see FIG. 3).

The charging contact assembly 1 has a first charging contact 20 and a second charging contact 22, which are used for the conventional transfer of the charging energy, specifically a charging current. The first charging contact 20 is designed to resemble a circular ring segment. The second charging contact 22 forms a kind of pin at the center of the circular ring segment. A contact surface 24 of the first charging contact 20 is located on a different level, i.e. on a different plane, than a contact surface 26 of the second charging contact 22. Specifically, the contact surface 24 is offset relative to an outer side 28 of the charging contact assembly 1 and thus also of the hearing aid 4.

The charging contact assembly 1 also has a control contact 30. This is similar in design to the first charging contact 20 and together with it, forms a continuous circular ring. The control contact 30 is galvanically isolated, at least externally, from the first charging contact 20 and the second charging contact 22.

Figure 3:
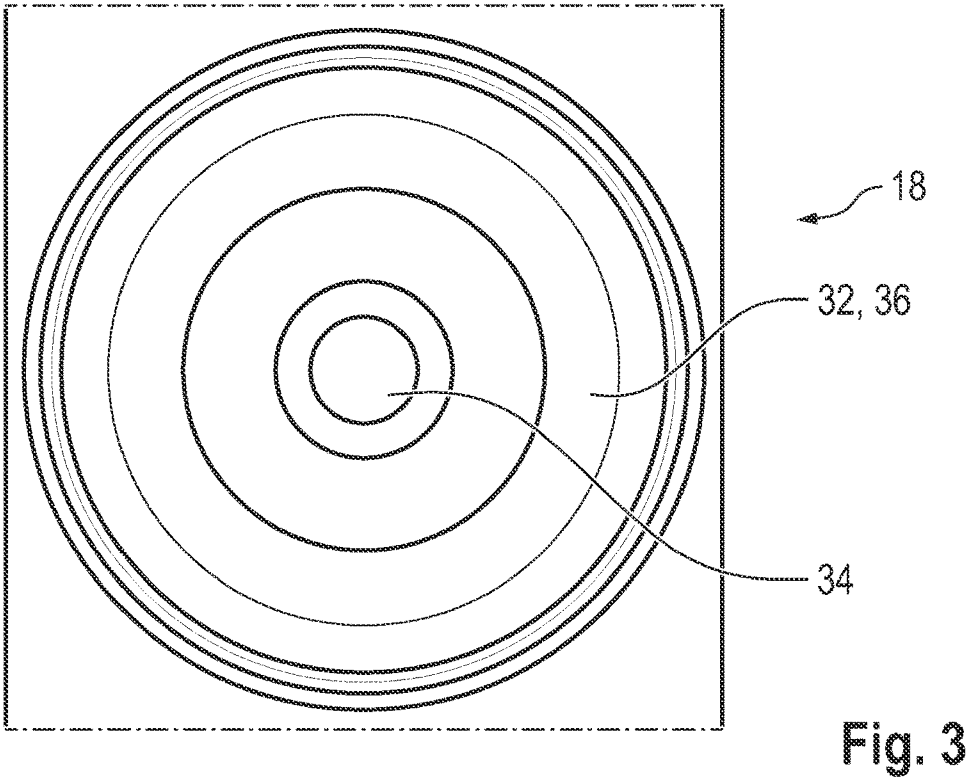
FIG. 3 is a schematic plan view of a mating contact assembly.

FIG. 3 shows the mating contact assembly 18 in more detail. This has a first, annular mating contact 32 configured for contacting the first charging contact 20, as well as a second mating contact 34. The latter is used for contacting the second charging contact 22 and in the present exemplary embodiment is formed by a kind of "pogo pin", i.e. a spring-mounted pin. In the unstressed state this protrudes above a contact surface 36 of the first mating contact 34.

Figure 4:
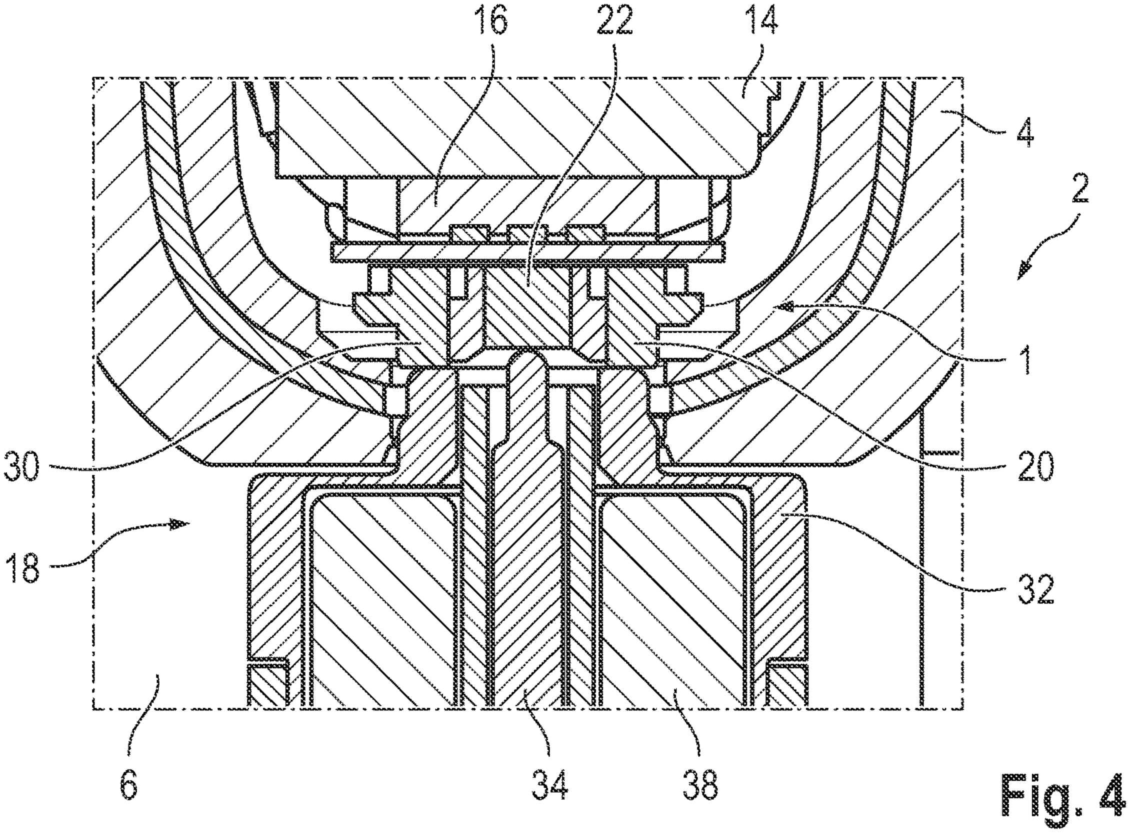
FIG. 4 is a schematic view according to FIG. 2 of the hearing device system with the charging contact assembly and the mating contact assembly in a proper contacting state.

FIG. 4 illustrates in more detail the proper contacting of the charging contact assembly 1 by the mating contact assembly 18, and the functional principle of the control contact 30. The second charging contact 22 is contacted by the second mating contact 34. The mating contact assembly 18 has a retaining magnet 38. This draws the charging contact assembly 1 towards the mating contact assembly 18. Thus, the second mating contact 34 is inserted against the spring action until the first mating contact 32 comes into contact with the first charging contact 20.

The control contact 30 has a contact surface 40 which is located in the same plane, i.e. at the same level, as the contact surface 24 of the first charging contact 20. Thus, the first mating contact 32 contacts not only the first charging contact 20 but also the control contact 30 and thus bridges them.

The control contact 30 is either connected to the charging controller 16 by means of a tri-state (not shown) in such a way that in the non-bridged state the control contact 30 has no logical signal, or alternatively is connected with high impedance (to "plus"). In the bridged state shown in FIG. 4, the control contact 30 is in fact pulled to another potential, in the present exemplary embodiment to that of the "logical zero". The charging controller 16 in this case is configured to detect from this potential change that the control contact 30 is bridged to the first charging contact 20, and to conclude from this that the charging contact assembly 1 is galvanically contacted with the mating contact assembly 18. If the charging controller 16 concludes that this contacting is present, the charging controller 16 switches and holds the hearing aid 4 in an inactive state in which no signal processing takes place. Preferably, in this state only the charging controller 16 is active in order to charge the secondary cell 14. If the bridging between the control contact 30 and the first charging contact 22 is "lost", in the case of the tri-state the control contact 30 returns to its "third" or non-logical state (or alternatively to its state with a high-impedance connection to plus), whereupon the charging controller 16 re-activates the hearing aid 4.

The subject matter of the invention is not restricted to the above-described exemplary embodiment. Rather, further embodiments of the invention can be derived by a person skilled in the art from the above description.

The following is a summary list of reference numerals and the corresponding structure used in the above description of the invention.

LIST OF REFERENCE SIGNS

1 charging contact assembly
2 hearing device system
4 hearing aid
6 charging unit
8 microphone
10 controller
12 loudspeaker
14 secondary cell
16 charging controller
18 mating contact assembly
20 charging contact
22 charging contact
24 contact surface
26 contact surface
28 outer side
30 control contact
32 mating contact
34 mating contact
36 contact surface
38 retaining magnet
40 contact surface

The invention claimed is:

1. A charging contact assembly for a hearing device system, comprising:

a first charging contact accessible on an outer side for contacting with a first mating contact of a mating contact assembly;

a second charging contact accessible on an outer side for contacting with a second mating contact of the mating contact assembly;

a control contact being galvanically isolated on an outer side from said first and second charging contacts, wherein said first charging contact and said control contact are disposed on a circular line around said second charging contact; and a charging controller configured to cause a deactivation of a hearing device associated with said first and said second charging contact when said control contact is bridged to said first charging contact.

2. The charging contact assembly according to claim 1, wherein said control contact is positioned such that it is contacted by said first mating contact in a contacting state.

3. The charging contact assembly according to claim 2, wherein:

said first charging contact has a contact surface; and said control contact has a contact surface which is disposed at a same level as said contact surface of said first charging contact.

4. The charging contact assembly according to claim 1, wherein said control contact is set to high impedance.

5. The charging contact assembly according to claim 2, wherein said charging controller is configured to detect a bridging of said control contact to said first charging contact from a fact that said control contact is pulled to a different electrical potential.

6. The charging contact assembly according to claim 1, wherein said contact surfaces of said first charging contact and of said control contact are each formed as a circular arc segment.

7. The charging contact assembly according to claim 5, wherein the different electrical potential is a potential to which said first charging contact is also connected.

8. A hearing device, comprising:

said charging contact assembly according to claim 1.

9. A hearing device system, comprising:

a corresponding mating contact assembly;

said charging contact assembly according to claim 1;

a hearing device having said charging contact assembly or said corresponding mating contact assembly; and a charging unit conversely having said corresponding mating contact assembly or said charging contact assembly.

* * * * *